March 11, 1930.    G. H. SCHWEDLER    1,750,245
STERILIZER
Filed Sept. 1, 1927    2 Sheets-Sheet 1
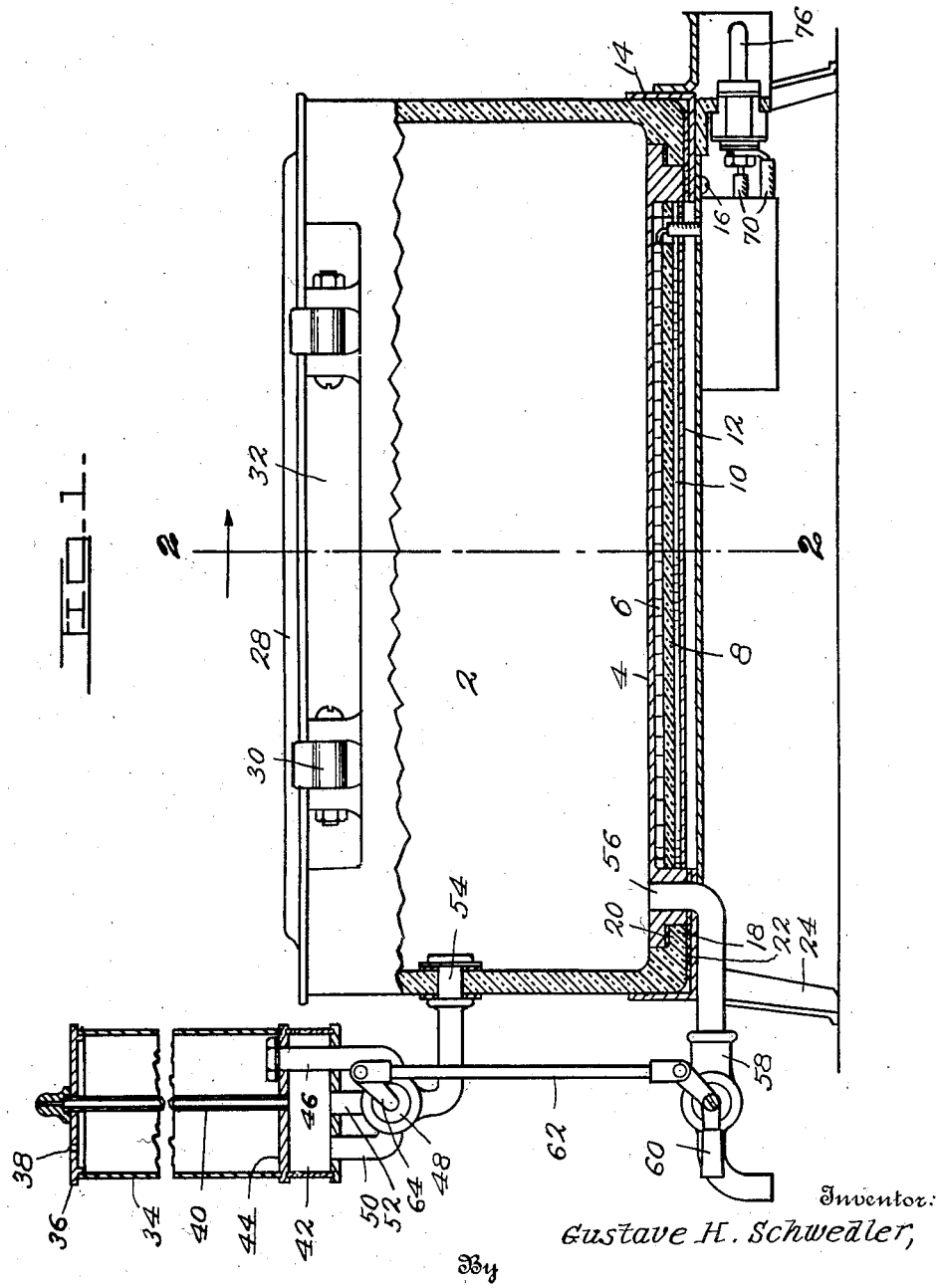
Witness:
Fred C. Fischer.
Inventor:
Gustave H. Schwedler,
By
F. G. Fischer,
Attorney.

March 11, 1930. G. H. SCHWEDLER 1,750,245
STERILIZER
Filed Sept. 1, 1927 2 Sheets-Sheet 2
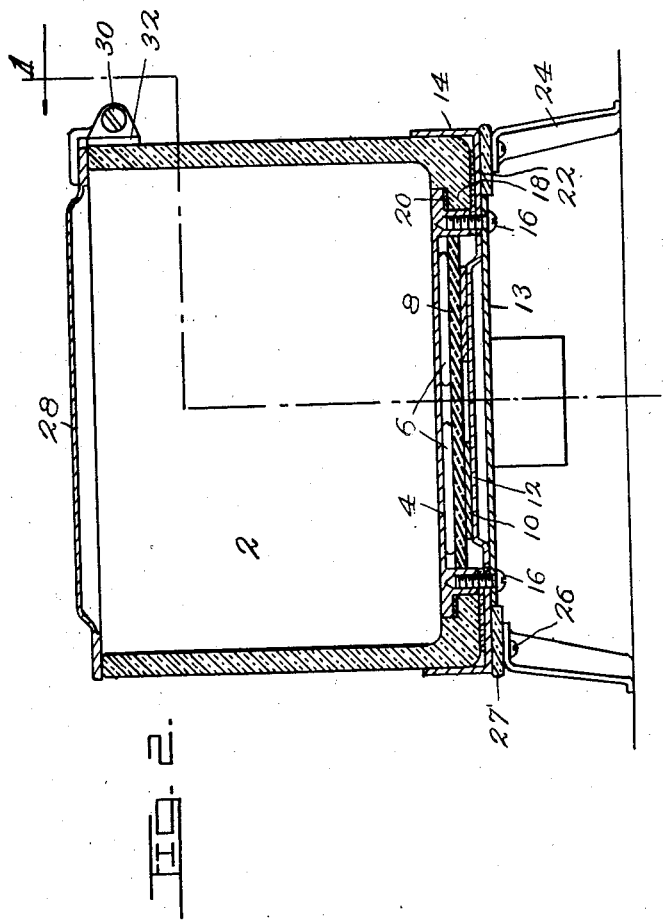
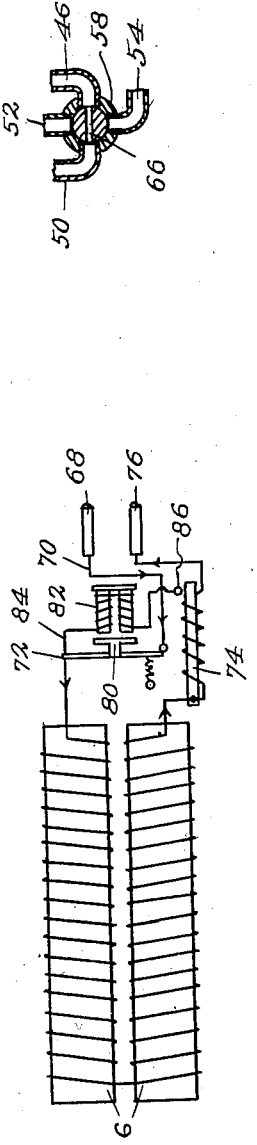
Inventor:
Gustave H. Schwedler,
By
F. G. Fischer,
Attorney
Witness:
Fred C. Fischer.

Patented Mar. 11, 1930

1,750,245

UNITED STATES PATENT OFFICE

GUSTAVE H. SCHWEDLER, OF KANSAS CITY, MISSOURI

STERILIZER

Application filed September 1, 1927. Serial No. 216,881.

My invention relates to apparatus for sterilizing dental and other instruments and one object is to provide an apparatus of this character in which the sterilizing medium is electrically heated.

A further object is to provide an apparatus of this character with means for automatically cutting off the electric current when the sterilizing medium reaches the boiling point.

Another object is to provide apparatus of this character with means whereby an antirust solution may be automatically admitted to the receptacle in which the instruments are sterilized, after the sterilizing medium has been drawn off.

Another object is to provide an apparatus of this character with a noncorrosive receptacle, such for instance as glass and which may be easily kept in a sanitary condition.

Other objects will hereinafter appear and in order that the invention may be fully understood, reference will now be had to the accompanying drawings, in which:

Fig. 1 is a broken irregular sectional view of the apparatus on line 1—1 of Fig. 2.

Fig. 2 is a cross section on line 2—2 of Fig. 1.

Fig. 3 is a diagrammatic view of the electric circuits with means for automatically opening the latter within a predetermined period.

Fig. 4 is a vertical section of a valve employed in carrying out the invention.

Referring in detail to the different parts, 2 designates the receptacle for holding the sterilizing medium such as water. The receptacle 2 is preferably made of glass capable of withstanding a high temperature so that it will not become cracked by the heated sterilizing medium. The receptacle 2 has a large opening in its bottom for the admission of a heating plate 4 which lies directly upon the heating elements 6, which in turn are superimposed upon a heavy sheet of insulation 8 consisting preferably of asbestos and which directs the heat from the heating elements 6 upwardly against the plate 4, so that the latter will prove more efficient in heating the sterilizing fluid.

The sheet of insulation 8 rests upon a pair of metallic strips 10 supported by a plate 12 carried by a bottom plate 13. The lower portion of the receptacle 2 is seated in a hollow rectangular frame 14. The parts 4, 6, 8, 10, 12, 13 and 14 are removably held together by suitable means such as screws 16, which are threaded in the part 4.

In order to prevent short-circuiting of the heating elements 6 by leakage from the receptacle 2, the lower portion of the latter surrounding the opening in the receptacle bottom is provided with a continuous marginal ledge 18 for the reception of a gasket 20 upon which the heating plate 4 is firmly drawn by the screws 16. As a further precaution against leakage a gasket 22 is interposed between the bottom of the receptacle 2 and the frame 14, which latter is supported upon legs 24 held in place by suitable means such as screws 26. Preferably, the legs 24 are made of metal and in order to prevent them from becoming unduly heated by conduction from the heating elements 6 insulation 27 is interposed between said legs and the frame 14.

The upper portion of the receptacle 2 is provided with a lid 28 which is mounted upon hinges 30 connected to a bar 32 which is bolted or otherwise suitably secured to the upper portion of the receptacle 2.

34 designates a tank for holding a supply of noncorrosive solution. Said tank 34 is provided with a removable lid 36 having an air port 38 and an air tube 40 which latter communicates with a compartment 42 which is divided from the main portion of the tank 34 by means of a partition 44.

Solution flows from the tank 34 to the compartment 42 through an outlet pipe 46, a valve 48 communicating with said outlet pipe 46, and an inlet pipe 50 leading from the valve 48 to the lower portion of the compartment 42, the surrounding vertical wall of which latter consists preferably of glass or other transparent material so that the operator may determine when said compartment is filled with the solution. The solution from the compartment 42 is admitted to the receptacle 2 through an outlet pipe 52, the valve 48, and an inlet pipe 54 leading from said valve 48 into the upper portion of the receptacle 2.

The receptacle 2 is provided at its lower portion with a discharge pipe 56 equipped with a drain cock 58 which is controlled by a lever 60. The lever 60 is pivotally secured to the lower end of a connecting rod 62, which in turn is pivotally connected at its upper end to a lever 64 secured to the valve 48 for the purpose of operating the latter. The foregoing parts are so arranged that when the drain cock 58 is opened to allow the sterilizing medium to flow from the receptacle 2, the valve 48 is adjusted to bring its transverse port 66 into communication with the outlet pipe 46 and the inlet pipe 50, air entering the port 38 will displace the antirust solution in the main portion of the tank 34 and cause it to flow into the compartment 42, and when the drain cock 58 is closed the valve 48 is adjusted to bring its port 66 into communication with the outlet pipe 52 and the inlet pipe 54 so that air entering through the tube 40 will displace the antirust solution within said compartment 42 and cause it to flow into the receptacle 2.

Referring more particularly to the diagram disclosed by Fig. 3, it will be understood that current for the heating elements 6 enters through a connector 68, a circuit wire 70, a self-opening switch 72, the heating elements 6, a circuit closer 74, and out through a connector 76. The connectors 68 and 76 may be connected to any suitable source and the current passing therethrough is automatically shut off as will now appear. As shown on the diagram Fig. 3, the switch 72 is normally held in closed position by the armature 80 of an electromagnet 82, which is arranged in a shunt 84 and has one end of its coil connected to a contact 86 and its opposite end to the switch 72. The circuit closer 74 includes two different metals, one of which expands to a greater extent than the other when subjected to a predetermined temperature and closes the shunt 84, causing the electromagnet 82 to become energized and attract its armature 80, thereby permitting the switch 72 to open the circuit and cut off the current.

From the foregoing description it is apparent that I have provided a sterilizer embodying the advantages above pointed out, and while I have shown one form of the invention I reserve all rights to such other forms and modifications as properly fall within the spirit and scope of the invention as claimed.

Having thus described my invention, what I claim and desire to secure by Letters Patent, is:

1. In a sterilizer, a receptacle, a drain cock connected to said receptacle and provided with a controlling lever, a tank mounted above said drain cock and having its lower portion partitioned off into a compartment, a pipe leading from the main portion of said tank, a pipe leading into the compartment, a pipe leading from the compartment, a pipe leading into the receptacle, a valve for establishing communication between said pipes and provided with a lever, and a connecting rod operably connecting the levers on the drain cock and said valve and whereby when the drain cock is opened the valve is adjusted to open communication between the main portion of the tank and its compartment and when the drain cock is closed said valve is adjusted to open communication between said compartment and the receptacle.

2. In a sterilizer, a receptacle, a drain cock connected to said receptacle, a tank mounted above said drain cock and divided into upper and lower compartments, a pipe leading from the upper compartment, a pipe leading into the lower compartment, a pipe leading from said lower compartment, a pipe leading into the receptacle, a valve for establishing communication between said pipes, and means operably connecting said valve and the drain cock and whereby when the drain cock is opened the valve is adjusted to open communication between the upper and lower compartments and when said drain cock is closed the valve is adjusted to open communication between the lower compartment and the receptacle.

3. In combination with a sterilizer having a receptacle, a drain cock connected to said receptacle, a tank adapted to hold a fluid and arranged on a higher plane than said drain cock, a partition dividing said tank into upper and lower compartments, and valve means controlled by the drain cock for opening communication between the compartments when the drain cock is opened and for opening communication between the lower compartment and the receptacle when the drain cock is closed.

In testimony whereof I affix my signature.
GUSTAVE H. SCHWEDLER.